Sept. 19, 1961 J. M. JACQUE 3,001,031

SELF-SUPPORTING ELECTRO-MECHANICAL TRANSDUCER ASSEMBLY

Filed Nov. 18, 1954

INVENTOR
JAMES M. JACQUE

BY Francis J. Klempay
ATTORNEY

United States Patent Office 3,001,031
Patented Sept. 19, 1961

3,001,031
SELF-SUPPORTING ELECTRO-MECHANICAL TRANSDUCER ASSEMBLY

James M. Jacque, Conneaut, Ohio, assignor to The Astatic Corporation, Conneaut, Ohio, a corporation of Ohio
Filed Nov. 18, 1954, Ser. No. 469,618
10 Claims. (Cl. 179—100.41)

The present invention has reference to electro-mechanical transducer elements for converting mechanical vibrations into usable electrical energy, and is particularly directed to a novel transducer element or member for incorporation with phonograph apparatus and similar equipment.

As an overall object, the present invention seeks to provide a novel and improved electro-mechanical transducer assembly for use in phonograph apparatus wherein the transducer element or device, in addition to serving in its ordinary capacity, constitutes a principal structural element in the tone arm or other supporting device. Thus, in conventional phonograph apparatus, for example, there is provided a tone arm assembly which comprises a record engaging stylus, a piezo-electric transducer element driven by such stylus, a cartridge casing for housing the transducer and stylus, a pivotally mounted tone arm member, and means to secure the cartridge casing in the outer free end of the tone arm member. On the other hand, the present invention contemplates utilizing the electro-mechanical transducer member itself as the tone arm, or as an integral portion thereof, thereby eliminating from the overall assembly a large number of expensive precision-made components, as well as eliminating a substantial number of delicate assembly operations.

A more specific object of the invention is the provision of an improved electro-mechanical member which may be mounted at one end in a phonograph assembly for universal movement with respect to the record supporting turntable of the assembly, and which is provided with means at its outer free end for directly mounting one or more record engaging styli. In accordance with prior art practices it has been common to incorporate into a tone arm member a complete transducer "cartridge," which is a complete and independent sub-assembled unit comprising one or more styli, a piezo-electric transducer element, a suitable chuck or mounting device for drivingly connecting the styli to the transducer element. The thus constituted cartridge is of very delicate construction, requiring a large number of fine components; and the complete unit is not only of a relatively expensive nature but it extremely delicate and muct be handled with care at all times to avoid damage. To eliminate these undesirable aspects or features of the prior art devices I propose to employ a large extruded or molded ceramic member of tubular or other desirable structural shape as a tone arm. At the outer end of such ceramic tone arm is mounted, directly, by cement, solder or other suitable means, one or more stylus members. The ceramic tone arm is formed of piezo-electric material such as barium titanate, for example, and is suitably polarized and provided with output electrode members, so that as the stylus member tracks the sound groove of a recording disc vibrations of the stylus are imparted to the tone arm and therein converted to electrical signals which appear at the output electrode members.

A further specific object of the invention is the provision of a novel combined tone arm and transducer member substantially as above described wherein is provided means for controlling the resonant vibratory frequencies of the tone arm member to insure high fidelity reproduction. Thus, where the ceramic transducer member constitutes its own supporting tone arm, as is proposed by the present invention, the size of the transducer is quite large and for that reason may tend to have undesirable resonance characteristics for certain applications. This may occur, for example, where the tone arm is unusually long, as in professional phonograph equipment. However, in accordance with the teachings of this invention of the related invention of Charles Maxon, described in co-pending application Ser. No. 469,794, filed November 18, 1954, which is now abandoned, I may in such cases modify and regulate the natural resonant vibratory frequencies of the tone arm device to insure high quality response characteristics.

Yet another specific object of the invention is the provision in a combined transducer and tone arm member of a novel and improved arrangement for mounting the tone arm for universal pivotal movement over a record supporting turntable.

The above and other objects and advtantages of the invention will become apparent upon full consideration of the following detailed specification and accompanying drawing wherein are shown certain preferred embodiments of the invention.

Figures 1, 2, 3, 4, 5, 6, 7, 8, 9, 10, 11, 12, 13, 14, 15, 16, 17, 18, 19:
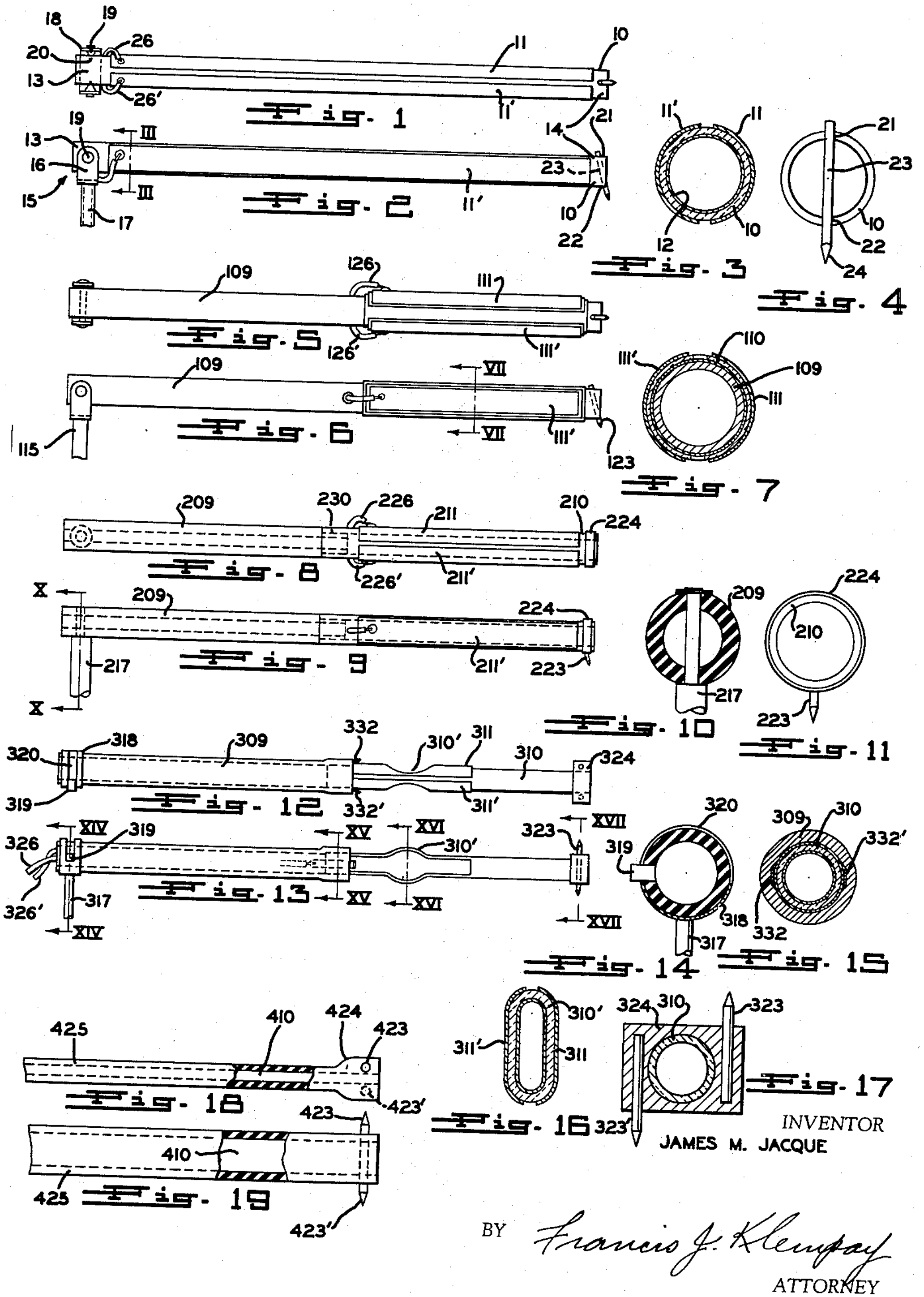
FIGURE 1 is a top plan view of a combined tone arm and transducer assembly constructed in accordance with the teachings of my invention.
FIGURE 2 is a side elevation of the apparatus of FIGURE 1.
FIGURE 3 is an enlarged section view taken along line III—III of FIGURE 2.
FIGURE 4 is an enlarged front end elevation of the apparatus of FIGURES 1 and 2.
FIGURES 5 and 6 are top plan and side elevation views respectively of a second embodiment or modification of the apparatus of my invention.
FIGURE 7 is an enlarged section view taken along line VII—VII of FIGURE 6.
FIGURES 8 and 9 are top plan and side elevation views respectively of a further embodiment or modification of the apparatus of my invention.
FIGURE 10 is an enlarged section view taken along line X—X of FIGURE 9.
FIGURE 11 is a front end elevation of the apparatus of FIGURES 8 and 9.
FIGURES 12 and 13 are top plan and side elevation views respectively of a further embodiment of my invention, incorporating novel means for interchangeably employing a plurality of separate record engaging styli.
FIGURES 14, 15 and 16 are enlarged section views taken along lines XIV—XIV, XV—XV and XVI—XVI respectively of FIGURES 13.
FIGURE 17 is an enlarged section view taken along line XVII—XVII of FIGURE 13.
FIGURES 18 and 19 are fragmentary top plan and side elevation views respectively, both partly in section, showing a still further embodiment of my invention.

Referring now to the drawing, and initially to FIGURES 1–4 thereof, the reference numeral 10 designates a hollow elongated member formed of ceramic piezo-electric material such as barium titanate. Preferably, the member 10 is formed by pressure extrusion methods, cut to length and baked or fired at a high temperature so that a relatively strong and rigid structure is afforded. In accordance with the teachings of the invention the member 10 is of suitable length, for example eight or ten inches, for use as a tone arm member in conventional phonograph equipment. Thus, at the rear or left hand end of the member or arm 10 there are provided oppositely disposed conical recesses 20 in which are received conical pintle members 19 carried on resilient or spring-like arms 18 of a yoke 16. The yoke 16 is carried at the upper end of a tubular support 17 which is arranged to engage in a conventional manner with a suitable bearing socket, not shown, located at the side of the turntable, also not shown, of convention phonograph equipment. The several last described components comprise the pivot 15 for the arm 10, which pivot, in accordance with common practice, provides for the universal movement of the forward or free end of the arm 10 over the surface of a record supporting turntable.

At the forward end of the arm 10 there are provided vertically aligned slots 21 and 22 in the uppermost and lowermost portions of the side wall of the tubular arm. The upper slot 21 is of greater depth, in a direction longitudinal of the arm 10, than is the lower slot 22. Received in these slots, and retained therein by cement or other suitable means, is a stylus member 23 having a record engaging tip 24 thereon. The stylus 23 may be of more or less conventional design, the tip portion 24 preferably being of hard metal or jewel as is common in this art.

In accordance with the teachings of the invention the stylus 23, when operatively engaged with a sound groove of a phonograph recording, will transmit the side-to-side undulations of the sound groove to the arm 10 to cause certain torsional and side-to-side vibrations or flexations therein. The arm 10, being of piezo-electric material, generates electrical charges which are proportional to severity of the flexing of the movements of the arm, in general accordance with the conventional practice with respect to the more common transducer cartridge assemblies. However, in this case it will be noted that the entire arm 10 constitutes a transducer, whereas in apparatus heretofore known a separate cartridge or assembly is employed in an electrically non-functional tone arm member.

On the outer surface of the arm 10 there are provided separate current conductive coatings, constituting electrodes 11 and 11'. The coatings are formed of a suitable paint, comprising comminuted conductive particles suspended in a suitable carrier fluid or vehicle, which is applied to desired areas of the tubular arm 10 and then heated or fired to form a hard conductive coating. As shown in FIGURES 1 and 2, the electrode coatings 11 and 11' extend substantially over the entire circumference of the arm 10, while being spaced or separated from each other at the top and the bottom. In the first illustrated embodiment the coatings 11 and 11' extend substantially from one end to the other of the arm, leaving short uncoated areas 13 and 14 at the extreme ends. In addition, a further electrode coating 12 is provided interiorly of the tubular arm 10 for use in the initial polarization of the piezo-electric material, as is conventional in the manufacture of ceramic types of transducers.

Adjacent the rear or inner end of the electrodes 11 and 11' there are soldered or otherwise connected suitable output conductors 26 and 26' respectively which are passed through the tubular pivot member 17. In a complete phonograph assembly the conductors 26 and 26' are connected to suitable electronic amplification and reproduction equipment; and in this manner charges generated within the piezo-electric material of the arm 10 are collected, transmitted and processed for reproduction.

The apparatus just described is of a highly simplified nature, as compared with equipment heretofore required for the same purpose. The baked or fired ceramic material of which the transducer is composed has been found to be amply strong for structural use as a stylus supporting tone arm member, and hence my novel combined use of the same member both as a transducer and as a stylus support provides many obvious and substantial advantages.

In the embodiment illustrated in FIGURES 5–7 there is provided a supporting arm member 109 which is formed of metal, ceramic or plastic and which, of itself, has no piezo-electric qualities. The arm 109 is supported at one end for universal pivotal movement by a suitable yoke member 115, and at the outer end of the arm 109 there are provided suitable vertically aligned slots for the reception of a stylus member 123. In accordance with the teachings of the invention the outer end portion of the arm 109 is provided with a sleeve 110 comprising a tubular ceramic piezo-electric member which is soldered or otherwise bonded to the outer surface of the supporting arm 109 in the manner shown. Electrode coatings 111 and 111' are provided upon opposite principal outer surface portions of the ceramic sleeve 110, and these electrodes are connected electrically to amplifier apparatus, not shown, by means of conductors 126 and 126' extending through the interior of the supporting tube 109. An inner electrode is of course required for initial polarization of the ceramic member 109. However, where the supporting arm 109 is formed of brass or other conductive material the arm itself constitutes the inner electrode. Otherwise an inner electrode coating, not specifically shown, is provided.

In the operation of the embodiment of FIGURES 5 and 6 the stylus 123 sets up vibrations within the supporting arm 109, in accordance with the side-to-side undulations of the sound groove of a phonograph record, and these vibrations are in turn transmitted directly to the sleeve-like ceramic transducer element 110 bonded to the outer end of the arm 109.

In the modification or embodiment shown in FIGURES 8–11 I employ a tubular ceramic piezo-electric transducer member 210 which constitutes the outer portion only of the complete tone arm, rather than the entire tone arm as in the embodiment of FIGURES 1–4. In the last mentioned embodiment the tubular ceramic member 210 is provided with outer electrode coatings 211 and 211', in addition to a conventional inner electrode, not specifically shown. The extreme forward end of the ceramic member 210 is uncoated and is adapted to frictionally receive a stylus mounting band 224, as shown in FIGURE 11. The band 224 mounts a record engaging stylus 223 at its lower end, and the desired arrangement is such that while the band 224 will faithfully transmit vibratory movements of the stylus 223 to the ceramic member 210, by reason of the frictional engagement of the band, the latter may be readily removed without tools or special skills to permit worn styli to be replaced.

To support the short ceramic element 210 there is provided a pivoted supporting arm 209 which, in the preferred embodiment of the invention, comprises a tubular member of suitable elastomeric material having a shouldered portion 230 at its outer end which engages with the inner end of the ceramic element 210. The tubular supporting member or arm 209 houses conductor wires 226 and 226', and is pivotally secured at its inner end to a post 217. The post 217 may be a fixed part of a photograph mechanism, not shown, so that only horizontal pivoting movement is provided, rather than universal pivoting movement as in conventional apparatus. However, it will be readily understood, that such vertical movement as is required of the outer end of the tone arm assembly is provided for by the inherent elastic qualities of the inner supporting member 209. This arrangement affords a highly simplified and economical pivotal support for a tone arm assembly as will be apparent upon inspection of FIGURE 10, for example.

The embodiment of FIGURES 12–17 is in the nature of a modification of the embodiment of FIGURES 8–11. Thus, the numeral 310 represents the outer end portion of a tone arm assembly, which, in accordance with the teachings of the invention, comprises a tubular ceramic piezo-electric member or element. The ceramic member 310 is attached at its inner end to the outer end of an elastomeric supporting arm 309 which is in turn received in and supported by an annular ring or band 318. The ring 318 is mounted for pivotal movement about a vertical axis by means of a tubular support 317, and inaccordance with the teachings of the invention the ring 318 receives the supporting arm 309 in such manner as to permit rotative movement thereof about its own longitudinal axis. As shown in FIGURE 14, for example, the ring 318 is provided along its upper side wall with a circumferential slot 320 which receives a pin 319 which is carried by and extends radially outward of the resilient supporting member 309. The pin 319 and slot 320 cooperate to limit the rotative positions of the arm 309.

At the outer end of the arm assembly i.e., at the outer end of the ceramic element 310, there is mounted a collar which has frictional engagement with the element 310 and which mounts oppositely disposed record engaging styli 323 and 323′, substantally as shown in FIGURE 17. The arrangement is such that when the arm assembly is manipulated into either of its rotative limit positions, as determined by the pin 319 and slot 320, one or the other of the styli 323 and 323′ are in record engaging position. Thus, one of the styli may be adapted for use in so-called micro-groove recording systems, while the other may be adapted for use in the standard systems.

As will be observed in FIGURES 12 and 13, a portion of the ceramic piezo-electric element is deformed from its general circular cross section to the more or less oval cross section illustrated in FIGURE 16. The purpose of this, as is more fully set forth in the co-pending application Ser. No. 469,617, filed November 18, 1954, of Maurice M. Palo, now U.S. Patent No. 2,900,536, is to concentrate the stresses caused by flexations of the ceramic element so that sharper and more responsive signal charges are generated at such point. In such cases the electrode coatings 311 and 311′ are confined generally to the area of the deformed portion; and in the embodiment illustrated in FIGURES 12 and 13 the entire forward end portion of the ceramic element 310 is devoid of any electrode coating.

To facilitate assembly of the apparatus shown in FIGURES 12 and 13 the elastomeric supporting member 309 is somewhat larger than the ceramic element 310 so that the latter is frictionally received within the former. Housed within the interior of the supporting member 309 are conductors 326 and 326′, which are provided at their outer ends with contact pieces 332 and 332′. These contact pieces are arranged to contact tightly the side walls of the ceramic member when the same is assembled with the supporting member 309. Thus, by extending the electrode coatings 311 and 311′ to the inner end of the ceramic element contact is automatically made between the output conductors and the transducer electrodes upon assembly of the apparatus.

In the embodiment of FIGURES 18 and 19, a ceramic piezo-electric element 410, constituting at least a portion of the structural make-up of a tone arm assembly, as well as a transducer element, is provided with a substantially continuous outer coating 425 of elastomeric material. One important purpose of the coating 425 is to strengthen and protect the ceramic element. Moreover, as fully described in the releated co-pending application Ser. No. 469,794 of Charles Maxon, now abandoned, the elastomeric coating may be selected in accordance with desired characteristics of hardness or elasticity in order to accurately regulate the vibratory resonance characteristics of the ceramic element 410.

As shown in FIGURE 18, the forward or outer end of the coating 425 is enlarged, as at 424 to receive one or more record engaging styli 423 and 423′, the arrangement being such, of course, that vibrations of the styli are faithfully transmitted to the ceramic element 410.

It should thus be apparent that I have carried out the several objects initially set forth. Perhaps the most basic and important feature of the invention resides in the provision of a tone arm apparatus or assembly wherein the piezo-electric transducer member is employed not only in its usual or customary capacity but additionally as an active structural element of the assembly. In this respect, the invention contemplates the use of the ceramic element as the only substantial structural component of the tone arm, or as a part only of the active structure of the tone arm. In either case the ceramic transducer element is active structurally, as distinguished from prior art arrangements wherein the transducer element is wholly non-functional in a structural sense.

As further basic concept of the invention is exemplified by the apparatus of FIGURES 5–7 wherein the tone arm structure directly supports a record engaging stylus so that vibrations thereof are transmitted to the tone arm itself, and thereby to a piezo-electric element which is, in essence, an integral part of the tone arm, even though in such case it does not in any substantial way function as an active structural element.

Various other features of the invention all deal with improved and simplified arrangements for constructing a complete tone arm assembly incorporating the basic concepts above set forth. Thus, it should be apparent that the several more or less detailed inventive features of the separate embodiments may have applicability to some or all of the other embodiments of the invention, and to other combinations or assemblies not specifically shown or described herein. Accordingly, reference should be had to the following appended claims in determining the full scope of the invention.

I claim:

1. In a phonograph tone arm assembly of the type having a substantial unsupported length the combination of an elongated ceramic piezo-electric element, means to mount said piezo-electric element at one end for pivotal movement whereby said tone arm is adapted for limited vertical movement and lateral swinging movement, a record engaging stylus mounted on said piezo-electric element at the other end thereof, electrode means contacting spaced surface portions of said piezo-electric element, and said piezo-electrical element forming an active structural load supporting portion of said substantial unsupported length of said tone arm.

2. A phonograph tone arm assembly of the type having a substantial unsupported length comprising an elongated stylus supporting member, means mounting said member at one end for swinging lateral and limited vertical movement, a record engaging stylus mounted directly on said stylus supporting member at the other end thereof whereby vibratory movements of said stylus are transmitted directly to said stylus supporting member, said stylus supporting member comprising at least in part an elongated piezo-electric transducer element, and said transducer element forming an active structural load supporting portion of said substantial unsupported length of said tone arm assembly.

3. Apparatus according to claim 2 further characterized by said stylus supporting member comprising an elastomeric supporting arm and said elongated piezo-electric element connected in end-to-end relation, said piezo-electric element constituting the outer end portion of said supporting member and mounting said stylus.

4. Apparatus according to claim 3 further characterized by said means mounting said member at one end comprising means to mount said elastomeric arm for pivotal movement about a vertical axis only.

5. Apparatus according to claim 2 further characterized by said means mounting said member at one end including means to journal said member for rotation about its own longitudinal axis between predetermined limit positions, said member mounting directly a pair of oppositely disposed selectively usable record disc engaging styli at its outer end.

6. Apparatus according to claim 2 further characterized by said stylus supporting member having a first element comprising its inner end portion, and having a second element comprising its outer end portion, said second element being an active structural component of said supporting member and being formed of ceramic piezo-electric material.

7. Apparatus according to claim 6 further characterized by said second element being of relatively uniform cross section throughout most of its length but having a portion of reduced cross section intermediate its ends, and said second element having electrode coatings on separate surface portions thereof adjacent said portion of reduced cross section.

8. Apparatus according to claim 6 further including an elastomeric coating covering said second element whereby to protect and impart strength to the same as well as to regulate its vibratory resonance characteristics.

9. A phonograph tone arm of the type having a substantial unsupported length comprising an elongated piezo-electric element, a stylus mounted from one end of said piezo-electric element, means mounting the other end of said element for limited movement, and said piezo-electric element forming an active load supporting structural portion of said substantial unsupported length of said tone arm.

10. A phonograph tone arm having a substantial unsupported length comprising an elongated transducer element, said transducer element constituting the entire elongated body portion of said tone arm, a stylus mounted on one end of said transducer element, means mounting said transducer element adjacent the other end thereof, and said transducer element forming the active load bearing structural portion of said tone arm and the sole means of support for said stylus.

References Cited in the file of this patent

UNITED STATES PATENTS

| | | |
|---|---|---|
| 2,106,051 | Dunning | Jan. 18, 1938 |
| 2,177,692 | De Toro | Oct. 31, 1939 |
| 2,328,478 | Mason | Aug. 31, 1943 |
| 2,594,948 | Lynch | Apr. 29, 1952 |
| 2,614,143 | Williams | Oct. 14, 1952 |
| 2,625,663 | Howatt | Jan. 13, 1953 |
| 2,900,536 | Palo | Aug. 18, 1959 |